United States Patent [19]

Kinoshita et al.

[11] Patent Number: 5,267,408
[45] Date of Patent: Dec. 7, 1993

[54] OTTER BOARD

[75] Inventors: Hiromi Kinoshita; Tsutomu Fukushima, both of Shimonoseki, Japan

[73] Assignee: Nichimo Co., Ltd., Tokyo, Japan

[21] Appl. No.: 791,439

[22] Filed: Nov. 13, 1991

[51] Int. Cl.⁵ .................. A01K 73/04; A01K 73/045
[52] U.S. Cl. .................................................. 43/9.7
[58] Field of Search ............................. 43/9.7, 43.13

[56] References Cited

FOREIGN PATENT DOCUMENTS 0549120 3/1977 U.S.S.R. ............................. 43/9.7
0749372 7/1980 U.S.S.R. ............................. 43/9.7
0360808 11/1931 United Kingdom .................. 43/9.7

Primary Examiner—Kurt C. Rowan

[57] ABSTRACT

An otter board, the net-mouth expanding force of which can be freely adjusted corresponding to the fishing style. The otter board according to the invention is charactrized in that, said otter board having biplane otter board members, an outer board member (3) is formed by a fixed board member (4) having openings therein and a moving board member or members (6, 6) having a shape closing said openings and located so as to move between said fixed board member (4) and an inner board member (2).

15 Claims, 2 Drawing Sheets

OTTER BOARD

TECHNICAL FIELD

The present invention relates to otter board, particuclarly the otter board having a freely adjustable net-mouth expanding force of trawl net

BACKGROUND OF THE INVENTION

In general, the otter board is used for net-mouth expanding of trawl net in the fishing, and has a variety of constructions such as monoplane or biplane structures, but its net-mouth expanding force must be adjusted according to the sort and purpose of fishing.

Heretofore, it has been usual for this purpose to change the attack angle of otter board with respect to the towing direction or to vary the surface area of main body of otter board.

However, the change of attack angle of otter board has a tendency of deteriorating the stability of net-mouth expanding force, so that this means has hardly been used. On the other hand, the variation of surface area of otter board necessitates to equip constantly the fishing boat with many sorts of otter board having different surface areas. This means a high equipment costs, and long time periods as well as dangerous operations for the exchange of otter boards. More specifically, Japanese Patent Laid Open No. 99881/1974 and Japanese Utility Model Laid Open No. 106458/1985 and the like disclose biplane otter boards, wherein the otter board members are fixed with each other and occupy large spaces respectively, so that the disadvantages described above are serious.

Therefore, an alternative means is disclosed as described in Japanese Patent publication No. 16858/1976 and Japanese patent Publication No. 42711/1977.

In there methods, drain through-holes or slit through-holes are formed through otter board having relatively a large thickness, wherein water flow rate through said through-holes are adjusted by regulating the opening thereof by means of closing valves or otter flaps, thereby to vary the net-mouth expanding force of otter board.

However, since openings of through-holes formed in the inner surface of respective otter boards are fixed and said closing valves or otter flaps are provided at the bottom of respective through-holes, the net-mouth expanding force of otter board can be varied relatively in a small extent, so a large variation thereof can not be easily obtained.

For eliminating the above disadvantages of heretofore known otter board, it is an object of the invention to create a novel otter board having a simple construction which can adjust in a large extent the net-mouth expanding force of otter board thereby to expand the trawl net precisely according to the sort of fishing and which can be used in the whole depth of sea for bottom, lower, middle and upper layer trawlings.

SUMMARY OF THE INVENTION

The above object is achieved according to the invention by the otter board which is characterized in that, said otter board having biplane otter board members, an outer board member is formed by a fixed board member having openings therein and a moving board member having a shape closing said openings and located so as to move between said fixed board member and an inner board member.

According to the invention, the net-mouth expanding force of otter board can be freely adjusted by varying the position of the moving board member between the fixed board member and the inner board member.

BRIEF DESCRIPTION OF DRAWINGS

For a better understanding of the present invention, reference is made to the following detailed descriptions taken in conjunction with the accompanying drawings, in which.

DETAILED DESCRIPTION OF THE INVENTION

Figure 1:
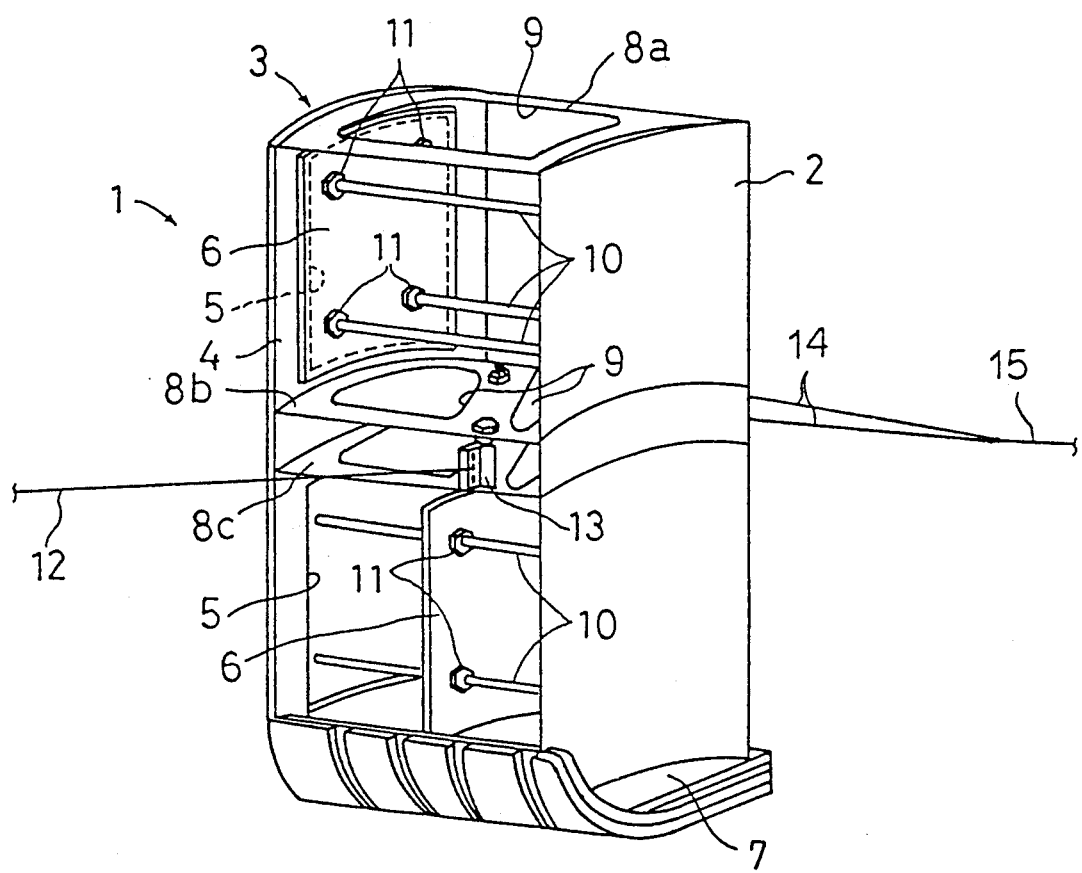
FIG. 1 is a perspective view of an embodiment of otter board according to the invention.

The invention will be described hereinbelow with reference to the attached drawings FIG. 1 to FIG. 3, which show an embodiment according to the invention.

The otter board shown has an inner board member 2 and an outer board member 3. The outer board member 3 consists of a fixed board member 4 having therein two openings 5, 5 and two moving board member 6, 6 having a shape such as to cover said openings 5, 5 and located so as to freely move between said fixed board member 4 and the inner board member 2. Respective board members 2, 4, 6 have concave shapes having their inner concave surfaces respectively. The inner board member 2 and the fixed board member 4 are connected substantially in parallel relation with each other by means of step board 7 and three connecting members 8a, 8b, 8c located in horizontal planes, in order to obtain a high strength of construction. The step member 7 has its front portion curved upwards. Each connecting member 8a, 8b, 8c has through-holes 9, 9 of suitable opening formed therein. Respective moving board members 6 are formed so as to be inserted onto four screw rods 10, 10 projecting in parallel relation with each other from the rear surface of inner board member 2 to fixed board member 4 and to be fixed at respective positions on said screw rods 10, 10 by means of fixing nuts 11. For the convenience of explanation, the upper moving board member 6 is shown at the position for closing the corresponding opening 5, while the lower moving board member 6 is located at an intermediate position between the board members 2 and 4 as shown in FIG. 1, but in the practical use of the otter board according to the invention, the upper and lower moving board members 6 are placed vertically at the same positions. A warp 12 reeled out from the fishing boat 18 is connected at its front end to a warp connecting means 13 which is pivotally connected to the front ends of two central connecting members 8b, 8c by means of bolts, nuts and other suitable fixing means. A trawl net 17 is combined to the otter board as described above through a otter pendant 14, a hand rope 15, net pendant 16 and the like.

The operation of the otter board 1 according to the embodiment of the invention as above is as follows:

In the first step, when the openings 5, 5 of outer board member 4 are covered by moving board member 6, 6 as shown by the upper moving board member 6 in FIG. 1 and by the moving board member 6 in dash line in FIG.

6 respectively, the total surface area receiving water stream is equal to the sum of inner surface areas of respective inner board member 2 and outer board member 3. This summary area corresponds to the largest value of surface area for the otter board 1.

Figure 2:
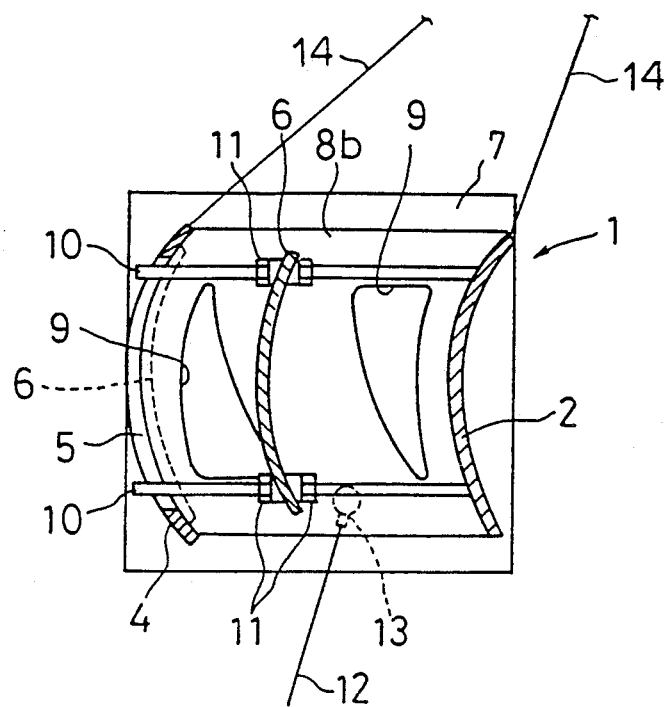
FIG. 2 is a cross-sectional view taken along the line II—II in FIG. 1.
Figure 3:
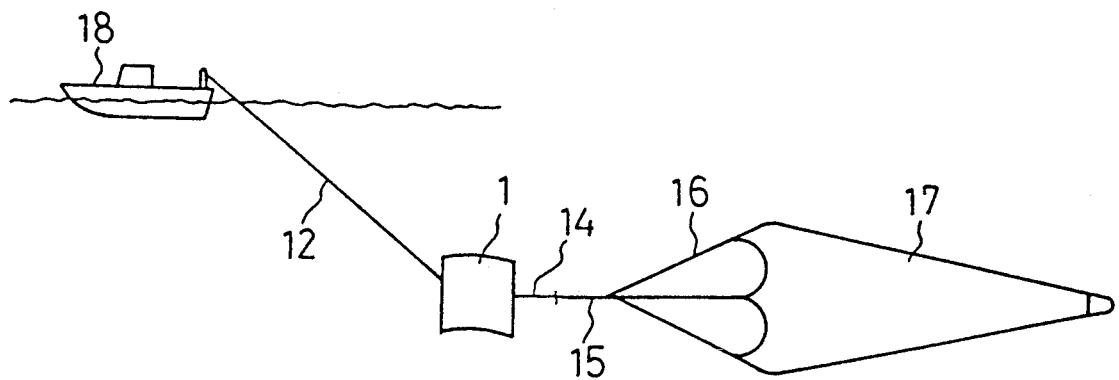
FIG. 3 is a side view showing the net-towing condition of otter board according to the invention.

On the other hand, when the fixing points of respective moving board members 6, 6 on corresponding screw rods 10 are made nearer to the inner board member 2 by using the fixing nuts 11 as shown by the lower moving board member 6 in continuous line in FIG. 1 and by the moving board member 6 in continuous line in FIG. 2, the total surface area receiving water stream decreases gradually. Then, when the moving board members 6, 6 contact closely onto the rear side surface of the inner board member 2, the total surface area receiving water stream becomes equal to the sum of inner side surfaces of respective inner board member 2 and fixed board member 4, which is the least value of water receiving area for otter board 1.

In general, the net-mouth expanding force of otter boards is known to increase or decrease in proportion to the surface area of the otter board.

Thus, according to the invention, it is possible to vary freely the net-mouth expanding force of otter board 1 in response to the fishing operation by adjusting the position of moving board member 6 between the fixed board member 4 and the inner board member 2.

Further, since the otter board 1 of the embodiment has a biplane construction, it has a high rigidity as a whole and a high resistance to mechanical shocks such that it is not deformed under any shocking actions Accordingly, the otter board according to the invention can be used in the whole range of depths for the purpose of bottom, lower, middle and upper depth trawlings, keeping its stable positions in water, which results in a increased fishing coefficient.

It is clear that the invention is in no way limited to the above described embodiment and those of the ordinary skill in the art would find many variations thereto.

I claim:

1. A rigid biplanar otter board towable through the sea in a longitudinal direction for transversely diverting and thereby opening the mouth of a net towed substantially longitudinally thereby, said otter board being of variable effective area presented to the sea when towed therethrough, to vary the towed net mouth transverse diverting force produced to open said net mouth, comprising:
    a. a pair of spaced apart, longitudinally elongated vertically upstanding substantially parallel curved boards, one of said boards having transverse apertures therethrough, said boards being curved respecting a vertical axis of the otter board, having substantially common curvature and being of substantially the same size;
    b. a generally planar horizontal step board fixedly connected to said curved boards at common lower extremities thereof and being generally perpendicular thereto;
    c. a plurality of parallel generally planar members extending between said boards of said pair and being generally parallel with and spaced from said step board;
    d. said step board and said planar members collectively providing means for maintaining said boards of said pair in spaced disposition respecting one another;
    e. a plurality of parallel threaded rods connected to and extending between said boards of said spaced apart pair and being generally parallel with said step board and said planar members;
    f. a plurality of vertically spaced intermediate curved boards parallel with and mounted between said boards of said pair on said rods and being freely movable therealong, for selectably covering said apertures in said apertured board of said spaced apart pair;
    g. said intermediate curved boards being vertically separated one from another by at least one of said planar members extending between said boards of said pair;
    h. threaded means movable along said rods for maintaining said intermediate board at a variably selected position along said rods relative to said boards of said pair.

2. The otter board of claim 1 further comprising means for pivotally connecting a warp tow line to said otter board.

3. The otter board of claim 2 wherein said connecting means pivots about a vertical axis respecting said otter board.

4. The otter board of claim 3 wherein said connecting means extends between and is connected to at least two adjacent planar members.

5. The otter board of claim 1 wherein said boards of said spaced pair are curved in the same direction relative to said vertical axis of said otter board so that the two parallel boards jointly provide respective convex and concave outwardly facing surfaces of said otter board.

6. The otter board of claim 1 wherein said step board includes an upwardly curved forwardly facing lip formed at a leading edge of said step board respecting the direction of tow of said otter board through the sea.

7. The otter board of claim 1 wherein said planar members extending between said boards of said pair have apertures extending vertically therethrough.

8. The otter board of claim 1 wherein respective ones of said plurality of vertically spaced intermediate curved boards selectably cover respective apertures in said apertured board of said spaced apart pair.

9. The otter board of claim 6 wherein said boards of said spaced pair are curved in the same direction relative to said vertical axis of said otter board so that the two parallel boards jointly provide respective convex and concave outwardly facing surfaces of said otter board.

10. The otter board of claim 9 wherein said planar members extending between said boards of said pair have apertures extending vertically therethrough.

11. The otter board of claim 10 wherein respective ones of said plurality of vertically spaced intermediate curved boards selectably cover respective apertures in said apertured board of said spaced apart pair.

12. The otter board of claim 11 further comprising means for pivotally connecting a warp line to said otter board.

13. The otter board of claim 12 wherein said connecting means pivots about a vertical axis respecting said otter board.

14. The otter board of claim 13 wherein said connecting means is mounted on said planar member.

15. The otter board of claim 14 wherein said connecting means extends between and is connected to two adjacent planar members at leading edges thereof respecting the direction of tow of said otter board through the sea.

* * * * *